United States Patent [19]

Ottengraf et al.

[11] Patent Number: 4,961,857
[45] Date of Patent: Oct. 9, 1990

[54] THROTTLING DEVICE AND METHOD FOR FEEDING GAS DISSOLVED IN LIQUID UNDER HIGH PRESSURE INTO LIQUID UNDER LOW PRESSURE

[75] Inventors: Simon P. P. Ottengraf, Koninglaan; Johannes G. Wijers, Brouwerstraat, both of Netherlands

[73] Assignee: Nijhuis Water B. V., Winterswijk, Netherlands

[21] Appl. No.: 110,185

[22] Filed: Oct. 19, 1987

Related U.S. Application Data

[63] Continuation-in-part of Ser. No. 96,134, Sep. 11, 1987, abandoned.

[30] Foreign Application Priority Data

Sep. 11, 1986 [NL] Netherlands ............ 8602297

[51] Int. Cl.[5] ............... C02F 1/24
[52] U.S. Cl. ............... 210/703; 210/221.2; 209/170; 261/65; 261/123
[58] Field of Search ............ 210/703, 704, 705, 706, 210/221.2; 261/65, 77, 123; 209/170

[56] References Cited

U.S. PATENT DOCUMENTS

| | | | |
|---|---|---|---|
| 3,645,892 | 2/1972 | Schulman | 210/706 |
| 4,442,045 | 4/1984 | Sciolla | 210/221.2 |
| 4,490,248 | 12/1984 | Filippov et al. | 210/703 |
| 4,534,862 | 8/1985 | Zlokarnik | 210/221.2 |

FOREIGN PATENT DOCUMENTS 1425387 9/1966 France .
1593262 7/1981 United Kingdom .

*Primary Examiner*—W. Gary Jones
*Attorney, Agent, or Firm*—Arnold, White & Durkee

[57] ABSTRACT

The invention relates to a throttling device for the supply of liquid under high pressure ($P_1$) having a gas dissolved in it into a liquid of lower pressure ($P_O$) the device having a supply orifice (2,7) between the high pressure and low pressure side of a dimension which only depends on the required flow capacity as well as downstream of said orifice a free floating body (3,9) of a dimension larger than the orifice (2,7), which body forms a slit (5,10) through which the high pressure flow is deflected into the space of lower pressure, the slit having sufficient length to generate a low flow pressure which, together with the low pressure of the low pressure space, keeps the body in equilibrium with the pressure forces acting at the supply side. The body can have different forms and adjusts itself depending on the circumstances.

The invention also relates to a method of supplying the throttling device in a process which requires a mist of gas bubbles as well as a device for performing the method, the device comprising a tube which stabilizes the generated mist.

20 Claims, 2 Drawing Sheets

THROTTLING DEVICE AND METHOD FOR FEEDING GAS DISSOLVED IN LIQUID UNDER HIGH PRESSURE INTO LIQUID UNDER LOW PRESSURE

CROSS-REFERENCE TO RELATED APPLICATIONS

This application is a continuation-in-part of application Ser. No. 096,134, filed Sept. 11, 1987, now abandoned.

BACKGROUND OF THE INVENTION

1. Field of the Invention

The invention relates in the first place to a throttling device for feeding a liquid under high pressure with a gas dissolved in it into a liquid under lower pressure, which device has a flow orifice between the high-pressure chamber and the lower-pressure chamber, and also downstream of said flow orifice, a body which forms with a wall of the low-pressure chamber a passage slit surrounding the body, through which slit the liquid undergoing pressure release flows, which body is held in an equilibrium state by the interaction of forces across said body as a consequence of the flow through the slit.

2. Description of the Related Bit

Such a device is known from the British Patent No. 1,593,262 and in fact the alternative embodiment, in particular, as described on page 2, left-hand column, lines 2 to 21. This known device consists of a first throttling device which is formed by several orifices in the side wall of a tube with a closed bottom which projects into an orifice of a pipe through which the gas-containing liquid flows. Said tube may have a cylindrical internal wall. In the alternative embodiment mentioned above, said internal wall of the tube becomes wider in a tapered manner in the flow direction and the tube may contain a second throttling device which is formed by a ball or other body which is restrained in a direction opposite to the flow by a spring. The flow through said tube produces a pressure difference across the ball which is under spring pressure, as a result of which interaction of forces a transfer slit is established.

There are very many different processes in which such a feed of liquid under higher pressure into a liquid under lower pressure can occur and in which a very precise control of the flow is necessary. Said liquid under higher pressure may contain particles which may be deposited in the throttling device, as a result of which the throttling action is affected. The optimum action of the throttling device in a particular process is dependent on dimensions, which have to be very precisely adjusted, of the passage through which the pressure release of the liquid under higher pressure to the liquid under lower Pressure has to take place. This is, in articular, the case where the liquid under higher pressure contains a gas which is dissolved in the liquid and which is then released during the pressure release in the throttling device and forms bubbles in the liquid of lower pressure. At the same time, if it is preferred, in the process concerned to obtain a bubble formation in which the small bubbles are extremely small, then the passage of the throttling device must also be very small and the latter readily becomes contaminated. In the above-mentioned known throttling device the first throttling device consists of small orifices in the side walls of the tube, which orifices readily become contaminated. If one of the orifices becomes blocked, then a heavier load is placed on the remaining orifices and this is disadvantageous for the process in which the throttling device is used.

It is known that increase in scale cannot be used with impunity if larger amounts of a liquid have to be fed into the other liquid via a throttling device which employs small throttling orifices. After all, the throttling action changes for a given pressure difference between the two liquids if the throttling orifice alone is enlarged. Increasing the number of small passages to obtain the required flow capacity has, however, the previously mentioned drawback that if a passage becomes blocked, the conditions change in the case of the other passage orifices.

In the cleaning of waste water it is known that water under higher pressure in which a gas, such as air is dissolved is fed into said waste water. During the pressure release of the water under higher pressure via a throttling device into the water under lower pressure, the air may be released from the dissolved state and this takes place with the formation of bubbles, as also described in the previously mentioned British Patent No. 1,593,262. Under these circumstances a cloud of microscopically minute small bubbles should be formed. These rise upwards in the water to be purified and may attach themselves to particles to be separated, which are transported as a result to the surface, where they can be removed by means known per se.

During the formation of bubbles, the surface tension of the water is of importance, since there should be equilibrium between the surface energy of the bubble and the pressure in the bubble.

Small bubbles have the tendency to form large bubbles by coalescence. Large bubbles are, however, undesirable, since the latter rise too rapidly to the surface and do not entrain the particles because they do not attach themselves to them. The problems of the formation of small bubbles in water by causing pressure release of water under higher pressure with air dissolved in it are known from the article entitled "The mechanism of dissolved air flotation for potable water: Basic Analysis and a Proposal" by J. K. Kitchener and R. J. Gochin published in "Water Research", Vol. 15, pages 585 to 590 incl., 1981. It is also known therefrom, however, that there has as yet been no success in forming very minute small bubbles if potable water is involved which, because of its purity, has a high surface tension.

An object of the invention is therefore to provide a throttling device in which the drawbacks of blockage and contamination can no longer occur, which is insensitive to increase in scale and with which it is possible to produce a very fine mist of minute small bubbles in the liquid under lower pressure.

An object of the invention is to provide, in particular, a throttling device which can be expediently used in a liquid purification process, such as a water purification process.

An object of the invention is also to achieve the result that the fine mist of minute small bubbles obtained with the throttling device is maintained.

SUMMARY OF THE INVENTION

The said aim is achieved according to the invention in the first place in that the slit between the body and the wall situated downstream of the flow orifice freely debouches at the point of the largest diameter of the body into the lower-pressure chamber and said chamber has, at the point of the debouchment of the slit, a clear section which is considerably larger than the slit surface at the point of said largest diameter of the body and in that, where the slit immediately adjoins the flow orifice, the flow in the slit makes an angle with the main flow direction through said flow orifice, all this being in a manner such that the liquid pressure formed in the slit is lower than the pressure of the low-pressure chamber and at the point of debouchment of the slit can immediately assume the low pressure, which slit, in the flow direction through the slit from the orifice to the end of the slit, has a length such that the net force on the surface of the body projected perpendicularly to the main flow direction of the flow orifice, said force being determined by the low pressure in the chamber and by the liquid pressure formed by the flow in the slit, is essentially in equilibrium with the thrust of the liquid in the flow orifice.

The throttling device which fulfils the above conditions has a flow orifice the dimensions whereof may be so large that contamination or blockage can no longer occur. The dimension of the flow orifice needs only to be related to the desired flow capacity and accordingly in principle has no throttling function.

The body which is situated opposite the debouchment of the flow orifice and which is essentially a freely mobile body forms, with the walls adjacent to the debouchment of the flow orifice, a slit through which the pressure of the liquid is released in its passage from the high-pressure chamber to the lower-pressure chamber, and as a result of the high velocity in said slit and as a result of the length of said slit and free debouchment into the lower-pressure chamber, there is produced in the slit a liquid pressure which is obviously lower than the thrust and which is also lower than the pressure in the lower-pressure chamber and, together with the last-mentioned pressure, forms an equilibrium with the thrust pressure.

The body adjusts itself under the influence of the forces acting thereon. In principle it does not have a shut-off function. The flow through the throttling device according to the invention sucks, as it were, the body towards the correct position.

It is also of importance in this connection that the flow which emerges from the debouchment of the flow orifice is immediately deflected at an angle in order to produce, in the sufficiently large slit, which freely debouches into the lower-pressure chamber, a flowpath in which the low flow-pressure, which attracts the body, can be formed.

Preferably, said angle is 90° in the section of the slit which immediately follows the debouchment of the flow orifice.

As a consequence of the size of the flow orifice and the automatically self-adjusting slit between the essentially freely mobile body and the stationary wall adjacent to the debouchment of the flow orifice, contamination is eliminated. Increase in scale is possible in a simple manner. For a larger throughput capacity, the orifice of the flow orifice is increased and the dimensions of the body are increased in accordance therewith.

It is surprising that, by this simple measure, a throttling device can be obtained which produces a very fine mist of minute small gas bubbles in the liquid under lower pressure.

Now if, according to the invention, the lower-pressure chamber directly following the body of the throttling device is a pipe whose inside diameter is so much larger than the largest diameter of the body and, consequently, of the slit that the pressure of the liquid emerging from the slit can freely decrease to the pressure which prevails in the lower-pressure chamber, but which, on the other hand, is not so large that the mist of minute small bubbles formed can move randomly in all directions, then it is found that the dispersion of gas bubbles formed by the pressure release is stabilized. If said stabilized mist or cloud of minute small bubbles now emerges via the pipe into a larger chamber adjacent thereto, then said mist remains stable. In other words, the small gas bubbles do not form any larger bubbles when said mist of minute small bubbles emerges into a chamber of larger dimensions.

Attention is drawn to the fact that, from French Patent No. 1,425,387, a device is known for injecting a gas into a liquid, such as air into water, in which use is made of a throttling device consisting of a cylindrical jacket with a sharp rim on which there rests a valve body which can be lifted up by the air fed to the inside of the jacket, the interaction of the forces of, on the one hand, the air, and, on the other hand, the liquid situated downstream of the valve providing for an adjustment of the air passage slit. This does not involve the pressure release of a liquid in which a gas is dissolved, but the direct feeding of air to a liquid. The slit between the sharp rim of the tube and the valve body has no length of significance. Only relatively large bubbles are formed which are not beneficial in the separation process because they do not attach themselves to fine particles which are to be separated.

With the body of the throttling device according to the invention being freely mobile, the possibility is not excluded that an additional force acts on said body which is directed in the direction of the center line of the flow orifice.

Said force can be provided by the force of gravity due to the mass of the body, but may also consist of a light spring which forces the body away from the hole or towards it in accordance with what is required and in accordance with the position of the throttling device.

After all, the body should be held in the vicinity of the flow orifice without being required to shut it off. If the body, when the flow stops, were able to depart from the orifice, for example, drop away, to a position in which it can no longer be affected by the flow when the latter is brought into operation again, the throttling device would no longer operate.

The additional force should therefore only serve to hold the body in the operating range after stopping.

In the throttling device known from the British Patent No. 1,593,262, the spring, mentioned therein, of the second throttling device serves not only to hold the body in its place but also plays an essential part as well in the interaction of forces with the flow.

Various shapes are possible for the body.

According to a first embodiment of the invention the body has a flat face which is situated in front of the debouchment of the flow orifice and the slit is defined by the stationary wall which surrounds the debouchment of the passage orifice and the flat face, which faces it, of the body, which is situated concentrically in front of said debouchment.

According to another embodiment, the body has a spherical face with a sphere diameter which is larger than the diameter of the section of the flow orifice and said body with the spherical face faces the debouchment of the flow orifice and, at least over a part of the spherical face, is symmetrically surrounded by the internal wall of a concave shell in the bottom of which the flow orifice is situated.

According to yet another embodiment, the body is a cone with a truncated apex facing the flow orifice, which cone interacts with a conical shell into the truncated apex of which the flow orifice debouches.

In all these embodiments the flow is deflected at the point of the debouchment from the flow orifice through an angle of preferably 90° and then flows along a relatively long slit path to the lower-pressure chamber. The pressure drop in the slit, which provides for the automatic self-adjustment of the body in the correct manner, can be explained by the Bernoulli law as will be explained in yet more detail.

The throttling device according to the invention is not susceptible to contamination. Should this occur, then the body adjusts itself accordingly. The body has no shut-off function. The dimensions of the flow orifice and of the body are obviously further defined by the process conditions, such as the nature and density of the liquids, temperatures and pressures.

It is surprising that, as a result of the flow through the slit directed transversely to the main flow direction, an essentially floating body is obtained which is not blown away but remains precisely at the required distance in front of the debouchment of the flow orifice and that, under these circumstances, the Pressure release of the gas-containing liquid then resells in a fine mist of small bubbles forming, regardless of the flow capacity.

This is particularly of importance in a flotation process in which larger bubbles cannot be used because they are not suitable for adhering to the particles to be separated.

In a method for the promotion of the flotation in a separation process by feeding a liquid saturated with gaseous medium under pressure with simultaneous pressure release via a throttling device to the liquid low-pressure medium in which the parts to be separated are situated, it is therefore of particularly great benefit if in this process use is made of the throttling device according to the invention as throttling device. This applies to many processes, inter alia, if water purification is involved.

Throttling device and method according to the invention are not restricted to use in a flotation process.

Many processes are conceivable in which such a throttling device may play a part, i.e. in which the formation of minute small bubbles plays a role, such as processes in the foodstuffs industry or in the oil industry and in other fields of technology.

The invention also comprises a device for the use of the method, which device is characterized in that the throttling device is situated in the end of a pipe, the inside diameter of which is larger than the largest diameter of the passage slit of the throttling device, which pipe debouches into the chamber in which the liquid containing the parts to be separated out of it is located.

According to the invention the body may have one or more projecting parts on the face which defines the passage slit. These ensure that, during a stoppage, the body does not remain stuck.

The invention will now be explained in more detail by reference to the drawings.

DETAILED DESCRIPTION OF PREFERRED EMBODIMENTS

Figure 1:
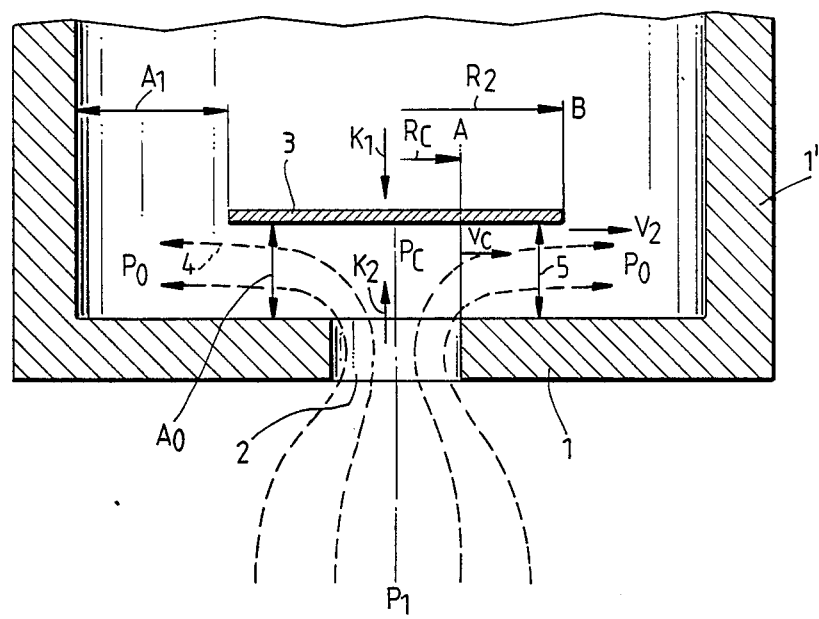
FIGS. 1 and 2 explain the principle underlying the invention in two ways.

FIG. 1 shows a wall 1 with a flow orifice 2 therein. Said wall 1 forms the end wall of a tube or pipe 1'. On one side of the wall 1 there is an overpressure $P_1$ and on the other side the lower pressure $P_0$. In front of the orifice 2 there is a plate 3 which, if the opening 2 is round, has the shape of a circular disc of larger diameter than that of the orifice 2. The flow from the chamber under the pressure $P_1$ to the chamber under the pressure $P_0$ is indicated by the arrows 4. The slit through which the flow takes place during the pressure release is defined by the distance between the wall 1 and the plate 3, which distance is indicated by 5. Said distance corresponds to a flow section $A_o$ which is largest at the point of the edge of the plate 3. Said slit between the wall 1 and the plate 3 is an annular slit so that the flow from the orifice 2 will flow out radially in all directions. Said flow takes place at high velocity as a result of which a pressure $P_C$ is formed beneath the plate 3 which is lower than the pressure $P_0$. This results in the plate being forced towards the orifice 2, as a result of which the circumstances change. A dynamic equilibrium is then produced between the forces which tend to move the plate away from the orifice 2 and the forces which are determined by the pressure $P_C$ and the pressure $P_0$ which tend to move the plate back. The vibration associated with this is audible.

The flow emerging from the slit finishes up in the chamber defined by the wall 1' having a flow section $A_1$, or clear section $A_1$, between the edge of the plate 3 and the wall 1', which flow section is larger than the flow section of the slit indicated by $A_0$.

In FIG. 1, A and B respectively indicate the cylindrical planes which define beginning and end of the narrow slit 5 between plate 3 and wall 1. The radii associated with these are indicated by $R_C$ and $R_2$ and the velocities at those points by $V_C$ and $V_2$ respectively.

If it is assumed that no energy dissipation occurs and if the mass of the plate 3 is neglected, then the following may be written for the Bernoulli equation for the flow between the planes A to B:

$$\tfrac{1}{2} V_2^2 - \tfrac{1}{2} V_C^2 + \frac{1}{\rho}(P_O - P_C) = 0$$

wherein
$\rho$ = the density of the medium,
$P_0$ = the lower pressure,
$P_C$ = the pressure beneath the plate 3.
From this it follows that:

$$P_C = P_O + \tfrac{1}{2}\rho(V_2^2 - V_C^2) \qquad (1)$$

From the continuity equation follows:

$$V_2 R_2 = V_C R_C \qquad (2)$$

From (1) and (2) it follows that:

$$P_C = P_0 + \tfrac{1}{2}\rho V_C^2 \left( \left( \frac{R_C}{R_2} \right)^2 - 1 \right)$$

Since $\dfrac{R_C}{R_2} < 1$ it follows from (3) that $P_c < P_o$.

This means, therefore, that the pressure decreases towards the center of the throttling device and is lower than the low pressure $P_0$. The plate 3 is therefore drawn towards the opening 2.

The force component which forces the plate 3 towards the orifice 2 is:

$$K_2 = \pi R_2^2 \{P_1 + \rho V_C^2 \alpha^2 \ln \alpha - \tfrac{1}{2}\rho d^2 V_C^2\}$$

wherein: $\alpha = \dfrac{R_C}{R_2}$

The force component which tends to move the plate away from the opening is:

$$K_1 = \pi R_2^2 P_O$$

If the plate moves towards the orifice, s situation arises in which the pressure $P_C$ due to the medium flowing through the orifice 2 will increase again. The plate then moves away from the orifice and a fluctuating condition arises which may also be described as an equilibrium condition. This is audible since the plate vibrates.

Figure 2:
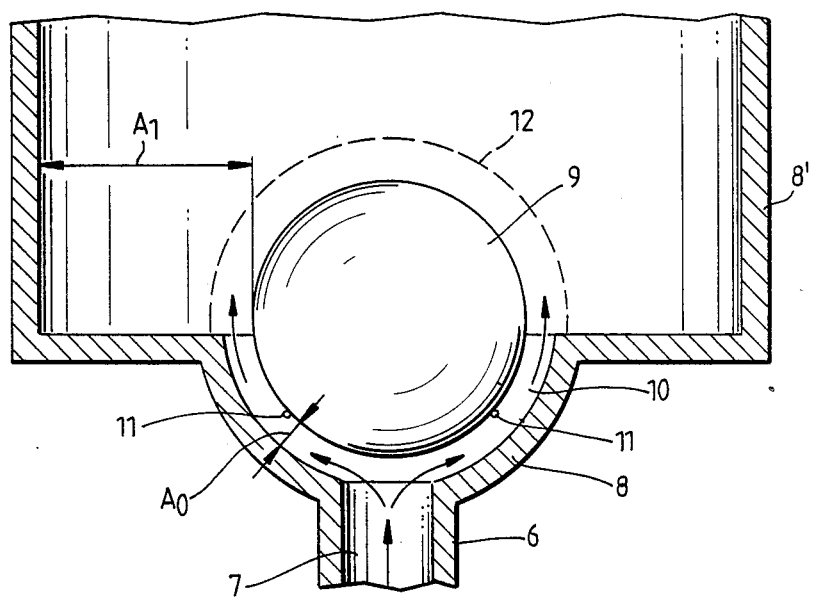

FIG. 2 shows a channel 6 which debouches via the orifice 7 into the bottom of a shell 8 which is concavely spherical. The body is a spherical body 9, i.e. a ball, and the narrow passage is formed between the wall of the ball and the inside wall of the shell 8 and is indicated by 10. In this embodiment, too, the shell 8 is situated at the end of a pipe-shaped tube 8' and the flow section $A_0$ of the slit between the sphere 9 and the shell 8 is less than the free flow section $A_1$ between sphere and tube wall 8'.

Projecting parts 11 are shown on the ball which ensure that the ball does not shut off the debouchment 7 during stoppage. Sticking is therefore not possible.

In FIGS. 1 and 2, the plate or ball respectively are drawn above the debouchment, but, during operation, the whole unit can be inverted and this shows that the body is in fact held in its position by pressure difference. In order to ensure that the ball or plate or other body cannot get lost when out of operation, a wire cage, as diagrammatically indicated by 12, may be provided.

Instead of the embodiments shown in FIGS. 1 and 2, others are conceivable.

Figure 3:
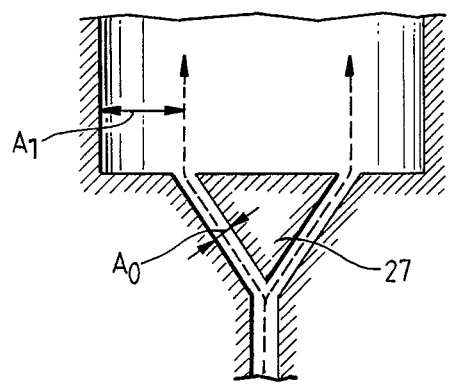
FIGS. 3 and 4 show diagrammatically other possible embodiments of the throttling device according to the invention.
Figure 4:
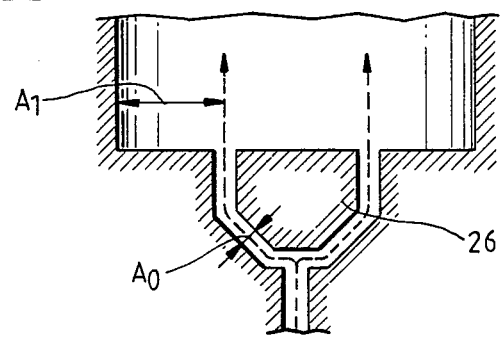

These are shown diagrammatically in FIGS. 3 and 4.

FIG. 3 shows an embodiment in which the body is formed by a cone 27. The main flow direction is in this case, via an acute angle, via a slit with the shape of a cone envelope having a flow section $A_0$ to the lower-pressure chamber which has a larger flow section $A_1$ with respect to the largest diameter of the cone 27.

In the embodiment according to FIG. 4, the body consists in the bottom section of a truncated cone 26. The flow is therefore initially deflected through 90° and then follows the path of the envelope of the cone 26 and the part with the shape of a cylinder envelope adjacent thereto.

Figure 5:
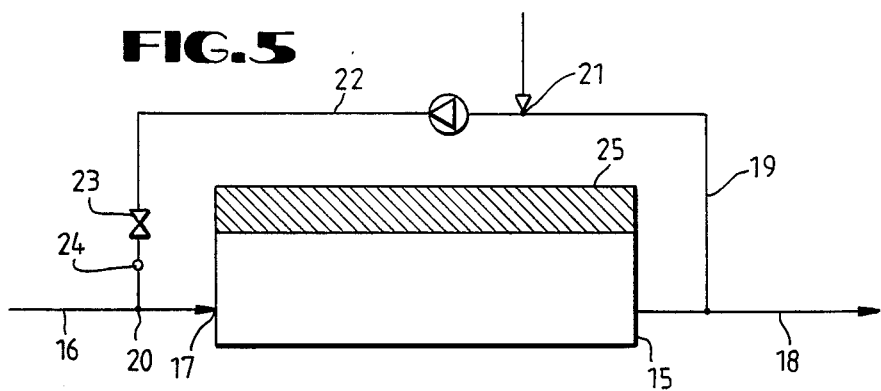
FIG. 5 shows diagrammatically the use in a water purification process.

FIG. 5 shows a flotation tank 15 which is fed at 16 with dirty water in which the dirt is to be bonded into flocks by means of a flocculation process. Said water enters the tank 15 at 17. Clean water is drained via the pipeline 18. A part of the clean water, i.e. 10 to 50% is fed back via the pipeline 19 and is fed again to the dirty water at 20.

Previously, however, air has been fed in at 21 such that the water with a pressure of approximately 1.5 to 8 bar in the section of pipeline 22 is saturated with air.

After passing through the shut-off valve 23, the water from the pipeline 21, 22 can escape via the throttling element 24 and then forms a cloud of minute small bubbles in the dirty-water pipeline which debouches into the tank 15, as a result of which the flocculated particles are entrained upwards therewith and form a layer 25 which can be removed in a known manner.

The throttling element 24 is located in the pipeline pipe which must obviously have a larger diameter than that of the throttling device and which must also fulfil the requirement that a lower pressure prevails therein. Between the throttling device 24 and the connection 20 to the dirty-water pipeline 16, a stable mist of minute small bubbles is thus formed which emerges with the dirty water into the flotation tank 15. Of course a method is possible in which said pipeline pipe debouches directly into the flotation tank 15 separate from the dirty-water pipeline.

We claim:

1. Throttling device for feeding a liquid under high pressure having gas dissolved therein into a liquid under lower pressure, comprising:

a means defining a high-pressure chamber ($P_1$);

a means defining a lower-pressure second chamber ($P_0$);

a means for feeding liquid under high pressure having gas dissolved therein into said high-pressure chamber;

a means defining a flow orifice between said high-pressure chamber and said lower-pressure chamber;

a means defining a pressure equilibrium zone including a movable body and a stationary wall of the lower-pressure chamber, said movable body being located downstream of said flow orifice, said movable body being operable to adjust its position responsive to differential pressure forces of the liquid flowing from the high-pressure chamber ($P_1$) to the lower-pressure chamber ($P_0$), the movable body and the stationary wall defining the pressure equilibrium zone such that the flow of liquid in the pressure equilibrium zone must change direction after exiting said flow orifice thereby forming a liquid pressure ($P_c$) in the pressure equilibrium zone, such that a net force acting on the surface of the movable body, including forces determined by the low pressure ($P_0$) in the lower-pressure chamber and by the liquid pressure ($P_c$) formed by the flow in the pressure equilibrium zone, are essentially in equilibrium with the thrust of the liquid passing through the orifice;

a passage slit surrounding the movable body defining by said movable body in cooperation with a portion of the stationary wall of the lower-pressure chamber, said slit having a width ($A_0$), through which slit the liquid undergoing pressure release flows, the slit between the movable body and the stationary wall being situated downstream of the flow orifice, said slit defining a debouchment zone at the point of the largest diameter of the movable body into the lower-pressure chamber ($P_0$), such that debouchment occurs as the liquid exits the slit, the liquid being permitted to assume the pressure of the lower-pressure chamber ($P_0$) after exiting the slit; and, a flow section ($A_1$) being defined in said lower-pressure chamber ($P_0$) at the point of debouchment of the slit, said flow section ($A_1$) being larger than the slit width ($A_0$), said flow section ($A_1$) being measured at the point of debouchment between a wall of the lower-pressure chamber ($P_0$) and the point of said largest diameter of the movable body;

the responsive adjustments of the position of the movable body being operative to widen or narrow the slit width ($A_0$), said widening or narrowing, in cooperation with the relative size of the flow section ($A_1$), being operative to cause a sufficient pressure release of the liquid under high pressure with gas dissolved therein to produce small bubbles of gas in the debouchment zone.

2. Throttling device according to claim 1, wherein:
the flow orifice and the portion of the slit immediately adjoining the flow orifice are disposed at an angle with respect to each other of approximately 90°.

3. Throttling device according to claim 1 or 2, wherein:
the lower-pressure chamber is a pipe in which dispersion of gas bubbles formed by the pressure release is stabilized.

4. Throttling device according to claim 1 or 2, wherein:
the movable body has a flat face which is situated in front of the debouchment of the flow orifice and the slit is defined by the stationary wall which surrounds the debouchment of the flow orifice and the flat face of the movable body, said flat face facing the stationary wall and being situated concentrically in front of said debouchment.

5. Throttling device according to claim 1 or 2, wherein:
the movable body has a spherical face with a sphere diameter which is larger than the diameter of the section of the flow orifice, and said movable body with said spherical face faces the debouchment of the flow orifice and, at least over a part of the spherical face, is symmetrically surrounded by an internal wall of a concave shell in the bottom of which the flow orifice is situated.

6. Throttling device according to claim 1 or 2, wherein:
the movable body is a cone with a truncated apex facing the flow orifice, said cone interacting with a conical shell into a truncated apex of which the flow orifice debouches.

7. Throttling device according to claim 6 wherein:
the lower-pressure chamber ($P_0$) is a pipe, the inside diameter of which is larger than the largest diameter of the passage slit, said pipe debouching into a chamber in which a liquid containing particles to be separated out of the liquid is located.

8. Throttling device according to claim 1 or 2, wherein:
the movable body is a cone with its apex facing the flow orifice, which cone interacts with a conical shell, into an apex of which the flow orifice debouches.

9. Throttling device for feeding a liquid under high pressure having gas dissolved therein into a liquid under lower pressure, comprising:
a means defining a high-pressure chamber ($P_1$);
a means defining a lower-pressure second chamber ($P_0$);
a means for feeding liquid under high pressure having gas dissolved therein into said high-pressure chamber;
a means defining a flow orifice between said high-pressure chamber and said lower-pressure chamber;
a movable body locate downstream of said flow orifice, said movable body in cooperation with a stationary wall of the lower-pressure chamber defining a passage slit surrounding the movable body, said slit having a width ($A_0$), through which slit the liquid undergoing pressure release flows;
said movable body being operable to adjust its position responsive to differential pressure forces of the liquid flowing from the high-pressure chamber ($P_1$) to the lower-pressure chamber ($P_0$) through said flow orifice;
the slit between the movable body and the stationary wall being situated downstream of the flow orifice and being operative to freely debouch at the point of the largest diameter of the movable body into the lower-pressure chamber ($P_0$);
a flow section ($A_1$) being found in said lower-pressure chamber ($P_0$) at the point of debouchment of the slit, said flow section ($A_1$) being larger than the slit width ($A_0$), said flow section ($A_1$) being measured at the point of debouchment between a wall of the lower-pressure chamber ($P_0$) and the point of said largest diameter of the movable body;
the responsive adjustments of the position of the movable body being operative to widen or narrow the slit width ($A_0$), said widening or narrowing, in cooperation with the relative size of the flow section ($A_1$), being operative to cause a sufficient pressure release of the liquid under high pressure with gas dissolved therein to produce small bubbles of gas;
the movable body and the stationary wall defining the slit, where the slit immediately adjoins the flow orifice, such that the flow in the slit makes an angle with the main flow direction through said flow orifice, whereby the flow of liquid must change direction such that a liquid pressure ($P_c$) is formed in the slit, and at the point of debouchment of the slit the liquid can immediately assume the pressure of the lower-pressure chamber ($P_0$);
the slit, in the flow direction through the slit from the orifice to the end of the slit, having a length such that a net force acting on the surface of the movable body, including forces determined by the low pressure ($P_0$) in the chamber and by the liquid pressure ($P_c$) formed by the flow in the slit, are essentially in equilibrium with the thrust of the liquid in the orifice;
the movable body has a flat face which is situated in front of the debouchment of the flow orifice and the slit is defined by the stationary wall which surrounds the debouchment of the flow orifice and the flat face of the movable body, said flat face facing the stationary wall and being situated concentrically in front of said debouchment; and, the movable body has a plurality of projections on the face that defines the slit.

10. Throttling device for feeding a liquid under high pressure having gas dissolved therein into a liquid under lower pressure, comprising:

a means defining a high-pressure chamber ($P_1$);

a means defining a lower-pressure second chamber ($P_0$);

a means for feeding liquid under high pressure having gas dissolved therein into said high-pressure chamber;

a means defining a flow orifice between said high-pressure chamber and said lower-pressure chamber;

a movable body located downstream of said flow orifice, said movable body in cooperation with a stationary wall of the lower-pressure chamber defining a passage slit surrounding the movable body, said slit having a width ($A_0$), through which slit the liquid undergoing pressure release flows;

said movable body being operable to adjust its position responsive to differential pressure forces of the liquid flowing from the high-pressure chamber ($P_1$) to the lower-pressure chamber ($P_0$) through said flow orifice;

the slit between the movable body and the stationary wall being situated downstream of the flow orifice and being operative to freely debouch at the point of the largest diameter of the movable body into the lower-pressure chamber ($P_0$);

a flow section ($A_1$) being found in said lower-pressure chamber ($P_0$) at the point of debouchment of the slit, said flow section ($A_1$) being larger than the slit width ($A_0$), said flow section ($A_1$) being measured at the point of debouchment between a wall of the lower-pressure chamber ($P_0$) and the point of said largest diameter of the movable body;

the responsive adjustments of the position of the movable body being operative to widen or narrow the slit width ($A_0$), said widening or narrowing, in cooperation with the relative size of the flow section ($A_1$), being operative to cause a sufficient pressure release of the liquid under high pressure with gas dissolved therein to produce small bubbles of gas;

the movable body and the stationary wall defining the slit, where the slit immediately adjoins the flow orifice, such that the flow in the slit makes an angle with the main flow direction through said flow orifice, whereby the flow of liquid must change direction such that a liquid pressure ($P_c$) is formed in the slit, and at the point of debouchment of the slit the liquid can immediately assume the pressure of the lower-pressure chamber ($P_0$);

the slit, in the flow direction through the slit from the orifice to the end of the slit, having a length such that a net force acting on the surface of the movable body, including forces determined by the low pressure ($P_0$) in the chamber and by the liquid pressure ($P_c$) formed by the flow in the slit, are essentially in equilibrium with the thrust of the liquid in the orifice;

the movable body has a spherical face with a sphere diameter which is larger than the diameter of the section of the flow orifice, and said movable body with said spherical face faces the debouchment of the flow orifice and, at least over a part of the spherical face, is symmetrically surrounded by an internal wall of a concave shell in the bottom of which the flow orifice is situated; and the movable body has a plurality of projections on the face that defines the slit.

11. Throttling device for feeding a liquid under high pressure having gas dissolved therein into a liquid under lower pressure, comprising:

a means defining a high-pressure chamber ($P_1$);

a means defining a lower-pressure second chamber ($P_0$);

a means for feeding liquid under high pressure having gas dissolved therein into said high-pressure chamber;

a means defining a flow orifice between said high-pressure chamber and said lower-pressure chamber;

a movable body located downstream of said flow orifice, said movable body in cooperation with a stationary wall of the lower-pressure chamber defining a passage slit surrounding the movable body, said slit having a width ($A_0$), through which slit the liquid undergoing pressure release flows;

said movable body being operable to adjust its position responsive to differential pressure forces of the liquid flowing from the high-pressure chamber ($P_1$) to the lower-pressure chamber ($P_0$) through said flow orifice;

the slit between the movable body and the stationary wall being situated downstream of the flow orifice and being operative to freely debouch at the point of the largest diameter of the movable body into the lower-pressure chamber ($P_0$);

a flow section ($A_1$) being found in said lower-pressure chamber ($P_0$) at the point of debouchment of the slit, said flow section ($A_1$) being larger than the slit width ($A_0$), said flow section ($A_1$) being measured at the point of debouchment between a wall of the lower-pressure chamber ($P_0$) and the point of said largest diameter of the movable body;

the responsive adjustments of the position of the movable body being operative to widen or narrow the slit width ($A_0$), said widening or narrowing, in cooperation with the relative size of the flow section ($A_1$), being operative to cause a sufficient pressure release of the liquid under high pressure with gas dissolved therein to produce small bubbles of gas;

the movable body and the stationary wall defining the slit, where the slit immediately adjoins the flow orifice, such that the flow in the slit makes an angle with the main flow direction through said flow orifice, whereby the flow of liquid must change direction such that a liquid pressure ($P_c$) is formed in the slit, and at the point of debouchment of the slit the liquid can immediately assume the pressure of the lower-pressure chamber ($P_0$);

the slit, in the flow direction through the slit from the orifice to the end of the slit, having a length such that a net force acting on the surface of the movable body, including forces determined by the low pressure ($P_0$) in the chamber and by the liquid pressure ($P_c$) formed by the flow in the slit, are essentially in equilibrium with the thrust of the liquid in the orifice;

the movable body is a cone with a truncated apex facing the flow orifice, said cone interacting with a conical shell into a truncated apex of which the flow orifice debouches; and the movable body has a plurality of projections on the face that defines the slit.

12. Throttling device according to claim 9, 10, or 11, wherein:

the flow orifice and the portion of the slit immediately adjoining the flow orifice are disposed at an angle with respect to each other of approximately 90°.

13. Throttling device for feeding a liquid under high pressure with a gas dissolved therein, into a liquid under lower pressure comprising:

a means defining a flow orifice between a space ($P_1$) in which the liquid is under high pressure and a space ($P_0$) in which the liquid is under a pressure which is lower than in the space with high pressure;

a means for feeding liquid under high pressure with a gas dissolved therein through said flow orifice;

a body located downstream of said flow orifice, said body being free to move towards and away from the flow orifice;

a means defining a circumferential passage through which the liquid flows from the outlet side of said flow orifice into said space with the lower pressure, said circumferential passage being defined downstream of said flow orifice between said body and a wall of the space ($P_0$) with the lower pressure which borders said flow orifice, debouching into the space with lower pressure, and having a circumferential outlet at the point of that debouchment;

said body being held in an equilibrium state by forces acting on said body and derived from the liquid pressure on the opposite sides of the body;

the circumferential outlet of the circumferential passage between the body and the wall having a flow section ($A_0$), the area of which has a dimensional relationship to the area of which has a dimensional relationship lower pressure measured just downstream of the point of debouchment between the outer edge of said body and an opposite wall of said space with the lower pressure, such that the area of the flow section ($A_0$) of the circumferential outlet is smaller than the area of the flow section ($A_1$) of the space with lower pressure;

the flow direction in said circumferential passage making an angle with the direction of flow through the flow orifice, said circumferential passage having a flow volume wherein a liquid pressure ($P_c$) formed inside said passage is lower than the pressure ($P_0$) in the space with the lower pressure, the liquid pressure ($P_c$) inside the passage being operative to act on the body with a force which, in combination with forces acting on the body by the lower pressure ($P_0$) in the space with the lower pressure, achieves an equilibrium with the forces acting on the body which are derived from the pressure of the high pressure flow through the flow orifice;

the throttling by the throttling device exclusively taking place as a result of the equilibrium of forces around the body and the resulting dimensional relationship between the area of the circumferential outlet ($A_0$) and the area of the flow section ($A_1$) of the space with lower pressure; and, the space with the lower pressure is a pipe, the axis of which coincides with the axis of the flow orifice.

14. Throttling device for feeding a liquid under high pressure with a gas dissolved therein, into a liquid under lower pressure comprising:

a means defining a flow orifice between a space ($P_1$) in which the liquid is under high pressure and a space ($P_0$) in which the liquid is under a pressure which is lower than in the space with high pressure;

a means for feeding liquid under high pressure with a gas dissolved therein through said flow orifice;

a body located downstream of said flow orifice, said body being free to move towards and away from the flow orifice;

a means defining a circumferential passage through which the liquid flows from the outlet side of said flow orifice into said space with the lower pressure, said circumferential passage being defined downstream of said flow orifice between said body and a wall of the space ($P_0$) with the lower pressure which borders said flow orifice, debouching into the space with lower pressure, and having a circumferential outlet at the point of that debouchment;

said body being held in an equilibrium state by forces acting on said body and derived from the liquid pressure on the opposite sides of the body;

the circumferential outlet of the circumferential passage between the body and the wall having a flow section ($A_0$), the area of which has a dimensional relationship to the area of a flow section ($A_1$) of the space with lower pressure measured just downstream of the point of debouchment between the outer edge of said body and an opposite wall of said space with the lower pressure, such that the area of the flow section ($A_0$) of the circumferential outlet is smaller than the area of the flow section ($A_1$) of the space with lower pressure;

the flow direction in said circumferential passage making an angle with the direction of flow through the flow orifice, said circumferential passage having a flow volume wherein a liquid pressure ($P_c$) formed inside said passage is lower than the pressure ($P_0$) in the space with the lower pressure, the liquid pressure ($P_c$) inside the passage being operative to act on the body with a force which, in combination with forces acting on the body by the lower pressure ($P_0$) in the space with the lower pressure, achieving an equilibrium with the forces acting on the body which are derived from the pressure of the high pressure flow through the flow orifice;

the throttling by the throttling device exclusively taking place as a result of the equilibrium of forces around the body and the resulting dimensional relationship between the area of the circumferential outlet ($A_0$) and the area of the flow section ($A_1$) of the space with lower pressure; and, said body has a flat surface facing said flow orifice.

15. Throttling device for feeding a liquid under high pressure with a gas dissolved therein, into a liquid under lower pressure comprising:

a means defining a flow orifice between a space ($P_1$) in which the liquid is under high pressure and a space ($P_0$) in which the liquid is under a pressure which is lower than in the space with high pressure;

a means for feeding liquid under high pressure with a gas dissolved therein through said flow orifice;

a body located downstream of said flow orifice, said body being free to move towards and away from the flow orifice;

a means defining a circumferential passage through which the liquid flows from the outlet side of said flow orifice into said space with the lower pressure, said circumferential passage being defined downstream of said flow orifice between said body and a wall of the space ($P_0$) with the lower pressure which borders said flow orifice, debouching into the space with lower pressure, and having a circumferential outlet at the point of that debouchment;

said body being held in an equilibrium state by forces acting on said body and derived from the liquid pressure on the opposite sides of the body;

the circumferential outlet of the circumferential passage between the body and the wall having a flow section ($A_0$), the area of which has a dimensional relationship to the area of a flow section ($A_1$) of the space with lower pressure measured just downstream of the point of debouchment between the outer edge of said body and an opposite wall of said space with the lower pressure, such that the area of the flow section ($A_0$) of the circumferential outlet is smaller than the area of the flow section ($A_1$) of the space with lower pressure;

the flow direction in said circumferential passage making an angle with the direction of flow through the flow orifice, said circumferential passage having a flow volume wherein a liquid pressure ($P_c$) formed inside said passage is lower than the pressure ($P_0$) in the space with the lower pressure, the liquid pressure ($P_c$) inside the passage being operative to act on the body with a force which, in combination with forces acting on the body by the lower pressure ($P_0$) in the space with the lower pressure, achieves an equilibrium with the forces acting on the body which are derived from the pressure of the high pressure flow through the flow orifice;

the throttling by the throttling device exclusively taking place as a result of the equilibrium of forces around the body and the resulting dimensional relationship between the area of the circumferential outlet ($A_0$) and the area of the flow section ($A_1$) of the space with lower pressure; and, said body is a sphere with a diameter which is larger than the diameter of the flow orifice, which sphere is partly and symmetrically surrounded by an internal wall of a concave shell in the bottom of which the flow orifice is situated.

16. Throttling device for feeding a liquid under high pressure with a gas dissolved therein, into a liquid under lower pressure comprising:

a means defining a flow orifice between a space ($P_1$) in which the liquid is under high pressure and a space ($P_0$) in which the liquid is under a pressure which is lower than in the space with high pressure;

a means for feeding liquid under high pressure with a gas dissolved therein through said flow orifice;

a body located downstream of said flow orifice, said body being free to move towards and away from the flow orifice;

a means defining a circumferential passage through which the liquid flows from the outlet side of said flow orifice into said space with the lower pressure, said circumferential passage being defined downstream of said flow orifice between said body and a wall of the space ($P_0$) with the lower pressure which borders said flow orifice, debouching into the space with lower pressure, and having a circumferential outlet at the point of that debouchment;

said body being held in an equilibrium state by forces acting on said body and derived from the liquid pressure on the opposite sides of the body;

the circumferential outlet of the circumferential passage between the body and the wall having a flow section ($A_0$), the area of which has a dimensional relationship to the area of a flow section ($A_1$) of the space with lower pressure measured just downstream of the point of debouchment between the outer edge of said body and an opposite wall of said space with the lower pressure, such that the area of the flow section ($A_0$) of the circumferential outlet is smaller than the area of the flow section ($A_1$) of the space with lower pressure;

the flow direction in said circumferential passage making an angle with the direction of flow through the flow orifice, said circumferential passage having a flow volume wherein a liquid pressure ($P_c$) formed inside said passage is lower than the pressure ($P_0$) in the space with the lower pressure, the liquid pressure ($P_c$) inside the passage being operative to act on the body with a force which, in combination with forces acting on the body by the lower pressure ($P_0$) in the space with the lower pressure, achieves an equilibrium with the forces acting on the body which are derived from the pressure of the high pressure flow through the flow orifice;

the throttling by the throttling device exclusively taking place as a result of the equilibrium of forces around the body and the resulting dimensional relationship between the area of the circumferential outlet ($A_0$) and the area of the flow section ($A_1$) of the space with lower pressure; and, the body is a cone with a truncated apex facing said flow orifice, which cone is at least partly and symmetrically surrounded by a conical shell into a truncated apex of which the flow orifice debouches.

17. Throttling device according to claim 15 or 16, wherein:

the body has a plurality of projections on the face that forms the passages with the shell wall.

18. Throttling device for feeding a liquid under high pressure with a gas dissolved therein, into a liquid under lower pressure comprising:

a means defining a flow orifice between a space ($P_1$) in which the liquid is under high pressure and a space ($P_0$) in which the liquid is under a pressure which is lower than in the space with high pressure;

a means for feeding liquid under high pressure with a gas dissolved therein through said flow orifice;

a body located downstream of said flow orifice, said body being free to move towards and away from the flow orifice;

a means defining a circumferential passage through which the liquid flows from the outlet side of said flow orifice into said space with the lower pressure, said circumferential passage being defined downstream of said flow orifice between said body and a wall of the space ($P_0$) with the lower pressure which borders said flow orifice, debouching into the space with lower pressure, and having a circumferential outlet at the point of that debouchment;

said body being held in an equilibrium state by forces acting on said body and derived from the liquid pressure on the opposite sides of the body;

the circumferential outlet of the circumferential passages between the body and the wall having a flow section ($A_0$), the area of which has a dimensional relationship to the area of a flow section ($A_1$) of the space with lower pressure measured just downstream of the point of debouchment between the outer edge of said body and an opposite wall of said space with the lower pressure, such that the area of the flow section ($A_0$) of the circumferential outlet is smaller than the area of the flow section ($A_1$) of the space with lower pressure;

the flow direction in said circumferential passage making an angle with the direction of flow through the flow orifice, said circumferential passage having a flow volume wherein a liquid pressure ($P_C$) formed inside said passage is lower than the pressure ($P_0$) in the space with the lower pressure, the liquid pressure ($P_C$) inside the passage being operative to act on the body with a force which, in combination with forces acting on the body by the lower pressure ($P_0$) in the space with the lower pressure, achieves an equilibrium with the forces acting on the body which are derived from the pressure of the high pressure flow through the flow orifice;

the throttling by the throttling device exclusively taking place as a result of the equilibrium of forces around the body and the resulting dimensional relationship between the area of the circumferential outlet ($A_0$) and the area of the flow section ($A_1$) of the space with lower pressure; and the body is a cone facing said flow orifice, which cone is at least partly and symmetrically surrounded by a conical shell, into an apex of which the flow orifice debouches.

19. Method of the promotion of flotation in a separation process comprising the steps of:

feeding a liquid saturated with a gaseous medium under pressure from a space in which the liquid is under high pressure and is saturated with the gaseous medium, through a means comprising a flow orifice, and into a space in which the liquid is under a pressure which is lower than in the space with high pressure, said space with lower pressure debouching into a third space containing a liquid from which a plurality of particles are to be separated by flotation;

changing the direction of the flow downstream of the flow orifice with respect to the flow through the flow orifice using a circumferential flow passage means defined between a body located downstream of said flow orifice, said body being free to move towards and away from the flow orifice, and a wall of the space with lower pressure, said wall bordering said flow orifice, through which circumferential passage the liquid flows from the outlet side of said flow orifice, down the circumferential passage, to a point of debouchment into the space of lower pressure, at which point it passes through a circumferential outlet having a flow section ($A_0$) and into a flow section ($A_1$) of the space with lower pressure, the area of the flow section ($A_0$) of the circumferential outlet being smaller than the area of the flow section ($A_1$) of the space with lower pressure as measured just downstream of the circumferential outlet, between the outer edge of said body and an opposite wall of said space with lower pressure;

holding the body in an equilibrium state by forces acting on said body and derived from the liquid pressure on the opposite sides of the body;

providing a flow volume through said circumferential passages wherein the liquid pressure formed inside said circumferential passage is lower than the pressure in the space with lower pressure;

generating gas bubbles by throttling with an equilibrium of forces including liquid pressure inside the passage acting on the body with a force which in combination with the force acting on the body by the lower pressure in the space with lower pressure, and the force acting on the body and derived from the pressure of the high pressure flow through the orifice; and, situating the throttling device in the end of a pipe having an inside diameter which is larger than the largest diameter of the passage of the throttling device, which pipe debouches into the third space containing the liquid from which particles are to be separated.

20. Method according to claim 19, wherein: the process is a liquid purification process.

* * * * *

UNITED STATES PATENT AND TRADEMARK OFFICE
CERTIFICATE OF CORRECTION

PATENT NO. : 4,961,857
DATED : October 9, 1990
INVENTOR(S) : Simon P. P. Ottengraf and Johannes G. Wijers It is certified that error appears in the above—identified patent and that said Letters Patent is hereby corrected as shown below:

Column 1, line 27, "Bit" should be -- Art --; line 56, "Pressure" should be -- pressure --; line 57, "articular" should be -- particular --.

Column 5, line 28, "Pressure" should be -- pressure --; line 29, "resells" should be -- results --.

Column 7, lines 14-25, should read as follows:

-- The force component which forces the plate towards the orifice 2 is:

$$K_1 = \pi R_2^2 P_0$$

The force component which tends to move the plate away from the opening is:

$$K_2 = \pi R_2^2 \left\{ P_1 + \varrho V_C^2 \alpha^2 \ln \alpha - \frac{1}{2} \varrho \alpha^2 V_C^2 \right\}$$

wherein:

$$\alpha = \frac{R_C}{R_2}$$

--.

UNITED STATES PATENT AND TRADEMARK OFFICE
CERTIFICATE OF CORRECTION

PATENT NO. : 4,961,857

DATED : October 9, 1990

INVENTOR(S) : Simon P. P. Ottengraf and Johannes G. Wijers

It is certified that error appears in the above—identified patent and that said Letters Patent is hereby corrected as shown below:

Column 7, line 27, "s" should be -- a --.

Column 8, line 62, "defining" should be -- defined --.

Column 10, line 15, "locate" should be -- located --.

Column 13, lines 41-42, "which has a dimensional relationship" should be -- a flow section ($A_1$) of the space with --.

Column 14, line 1, delete "the" (second occurrence); line 50, "achieving" should be -- achieves --.

Column 17, lines 12-13, "passages" should be -- passage --.

Column 18, line 33, "passages" should be -- passage --.

Signed and Sealed this

Twenty-fifth Day of February, 1992

*Attest:*

HARRY F. MANBECK, JR.

*Attesting Officer*      *Commissioner of Patents and Trademarks*